US012617411B2

(12) United States Patent
Kim et al.

(10) Patent No.: US 12,617,411 B2
(45) Date of Patent: May 5, 2026

(54) APPARATUS AND METHOD FOR PROVIDING VEHICLE SOUND

(71) Applicants: HYUNDAI MOTOR COMPANY, Seoul (KR); KIA CORPORATION, Seoul (KR)

(72) Inventors: Ki Chang Kim, Suwon-si (KR); Sang Jin Hong, Hwaseong-si (KR); Dong Chul Park, Anyang-si (KR); Eun Soo Jo, Hwaseong-si (KR); Jeong Goo Kang, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 207 days.

(21) Appl. No.: 18/221,282

(22) Filed: Jul. 12, 2023

(65) Prior Publication Data

US 2024/0190443 A1     Jun. 13, 2024

(30) Foreign Application Priority Data

Dec. 13, 2022     (KR) ........................ 10-2022-0173893

(51) Int. Cl.
*B60W 40/09*          (2012.01)
*B60W 50/14*          (2020.01)
(52) U.S. Cl.
CPC ............ *B60W 40/09* (2013.01); *B60W 50/14* (2013.01); *B60W 2050/143* (2013.01); *B60W 2540/01* (2020.02)
(58) Field of Classification Search
CPC .. B60W 40/09; B60W 50/14; B60W 2540/01; B60W 2050/143
See application file for complete search history.

(56) References Cited

U.S. PATENT DOCUMENTS 10,878,787 B2 * 12/2020 Hampiholi ............. B60K 35/10
2021/0031757 A1 * 2/2021 Boulton .............. B60W 60/001
(Continued)

FOREIGN PATENT DOCUMENTS

KR      20210063284 A      6/2021
KR      20220010089 A      1/2022
(Continued)

OTHER PUBLICATIONS

Peter Salovey et al., Emotional Intelligence, 1990, 27 pp, Baywood Publishing Co., Inc.

*Primary Examiner* — Peter D Nolan
*Assistant Examiner* — Mikko Okechukwu Obioha
(74) *Attorney, Agent, or Firm* — Lempia Summerfield Katz LLC

(57)          ABSTRACT

An apparatus for providing a vehicle sound includes a communicator configured to communicates with an electronic device, a detector configured to detect driver's driving pattern information and road driving condition information of a vehicle, and a controller coupled to the communicator and the detector. The controller is configured to obtain music information from the electronic device and calculate a music emotional quotient (EQ) index based on the music information, the driver's driving pattern information, and the road driving condition information. The controller is also configured to select a game sound type based on the music EQ index, and provide an emotional sound matched with the game sound type.

16 Claims, 10 Drawing Sheets

(56)         References Cited

U.S. PATENT DOCUMENTS

| | | | | |
|---|---|---|---|---|
| 2021/0261050 | A1* | 8/2021 | Sobhany | B60Q 3/80 |
| 2022/0135052 | A1* | 5/2022 | Patel | G06V 20/588 |
| | | | | 340/439 |
| 2022/0219532 | A1* | 7/2022 | Wang | G01S 15/32 |
| 2022/0369059 | A1 | 11/2022 | Kim et al. | |
| 2023/0186878 | A1* | 6/2023 | Wipperfürth | G06F 3/165 |
| | | | | 715/772 |
| 2024/0025416 | A1* | 1/2024 | Seneger | B60W 40/08 |
| 2024/0409113 | A1* | 12/2024 | Aoki | B60W 50/14 |

FOREIGN PATENT DOCUMENTS

| | | |
|---|---|---|
| KR | 102377920 B1 | 3/2022 |
| KR | 20220150689 A | 11/2022 |

* cited by examiner

200

SOUND SOURCE DB

MUSIC PATTERN ANAYSIS

| CLASSIFICATION | Pleasure | Arousal | Dominance |
|---|---|---|---|
| MUSIC PATTERN (1):<br>K-POP | +++ | ++ | + |
| MUSIC PATTERN (2):<br>CLASSICAL MUSIC | + | +++ | ++ |
| MUSIC PATTERN (3):<br>IDOL/ELECTRONIC MUSIC | ++ | + | +++ |

EMOTIONAL ADJECTIVES

FUN, RHYTHMICAL, REALISTIC, TEARFUL, LOUD, FRANTIC, MILD, ANGRY, COMFORTABLE, STABLE, IMPRESSIVE, SMOOTH, SOFT, LUXURIOUS, SLEEPY, UNCOMFORTABLE, UNIQUE, DANCEABLE, FUTURISTIC, SPACESHIP-LIKE, REFINED, INTENSE, OBSCURE, BORING

PARAMETERIZATION (CONTENT)

| FUN HEALING SOUND | COMFORTABLE AND FAMILIAR SOUND | UNIQUE PERSONALIZED SOUND |
|---|---|---|

FIG.6

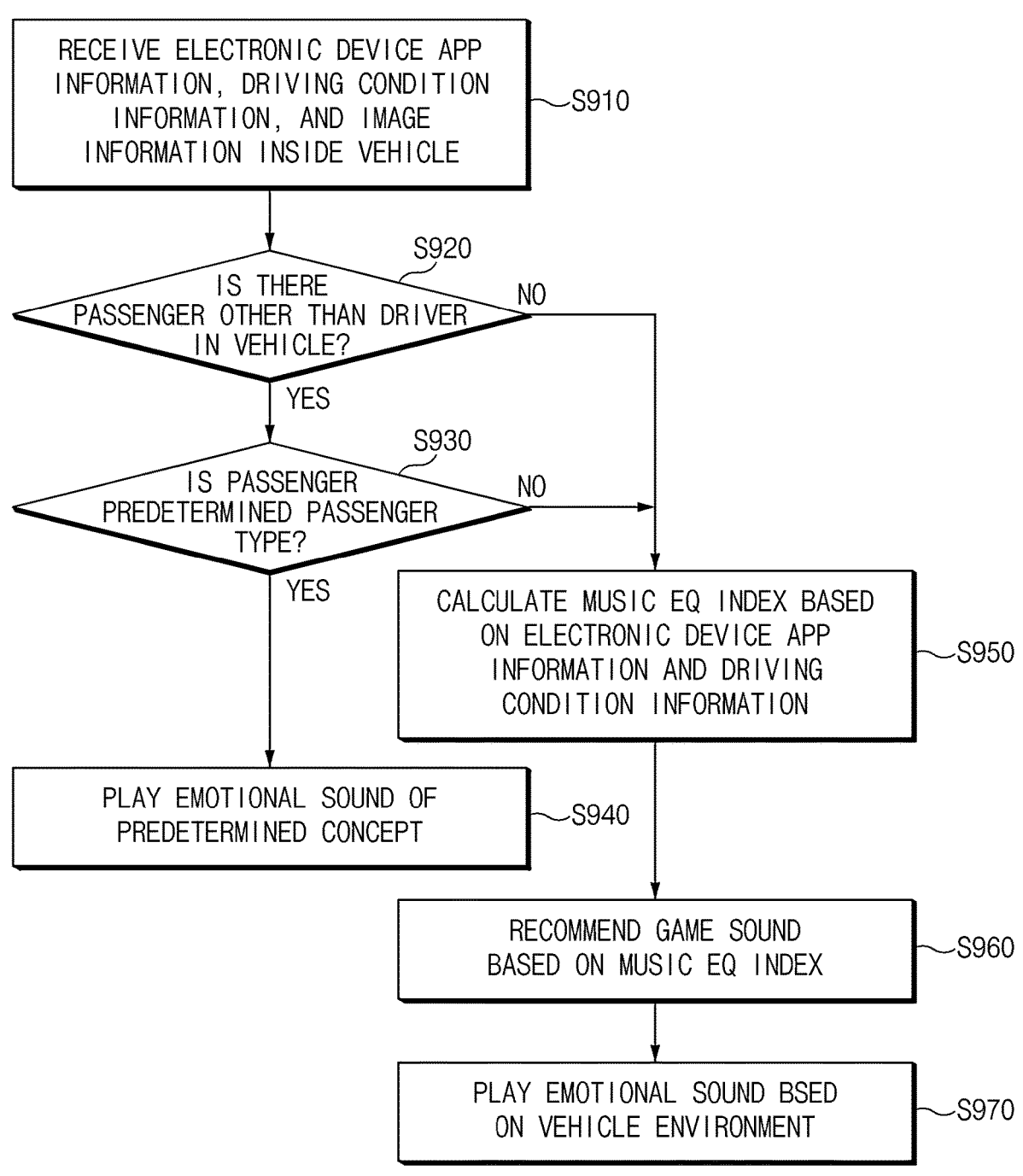

RECEIVE ELECTRONIC DEVICE APP INFORMATION, DRIVING CONDITION INFORMATION, AND IMAGE INFORMATION INSIDE VEHICLE ~S910

IS THERE PASSENGER OTHER THAN DRIVER IN VEHICLE? S920
NO
YES

IS PASSENGER PREDETERMINED PASSENGER TYPE? S930
NO
YES

CALCULATE MUSIC EQ INDEX BASED ON ELECTRONIC DEVICE APP INFORMATION AND DRIVING CONDITION INFORMATION ~S950

PLAY EMOTIONAL SOUND OF PREDETERMINED CONCEPT ~S940

RECOMMEND GAME SOUND BASED ON MUSIC EQ INDEX ~S960

PLAY EMOTIONAL SOUND BSED ON VEHICLE ENVIRONMENT ~S970

Figure 10:
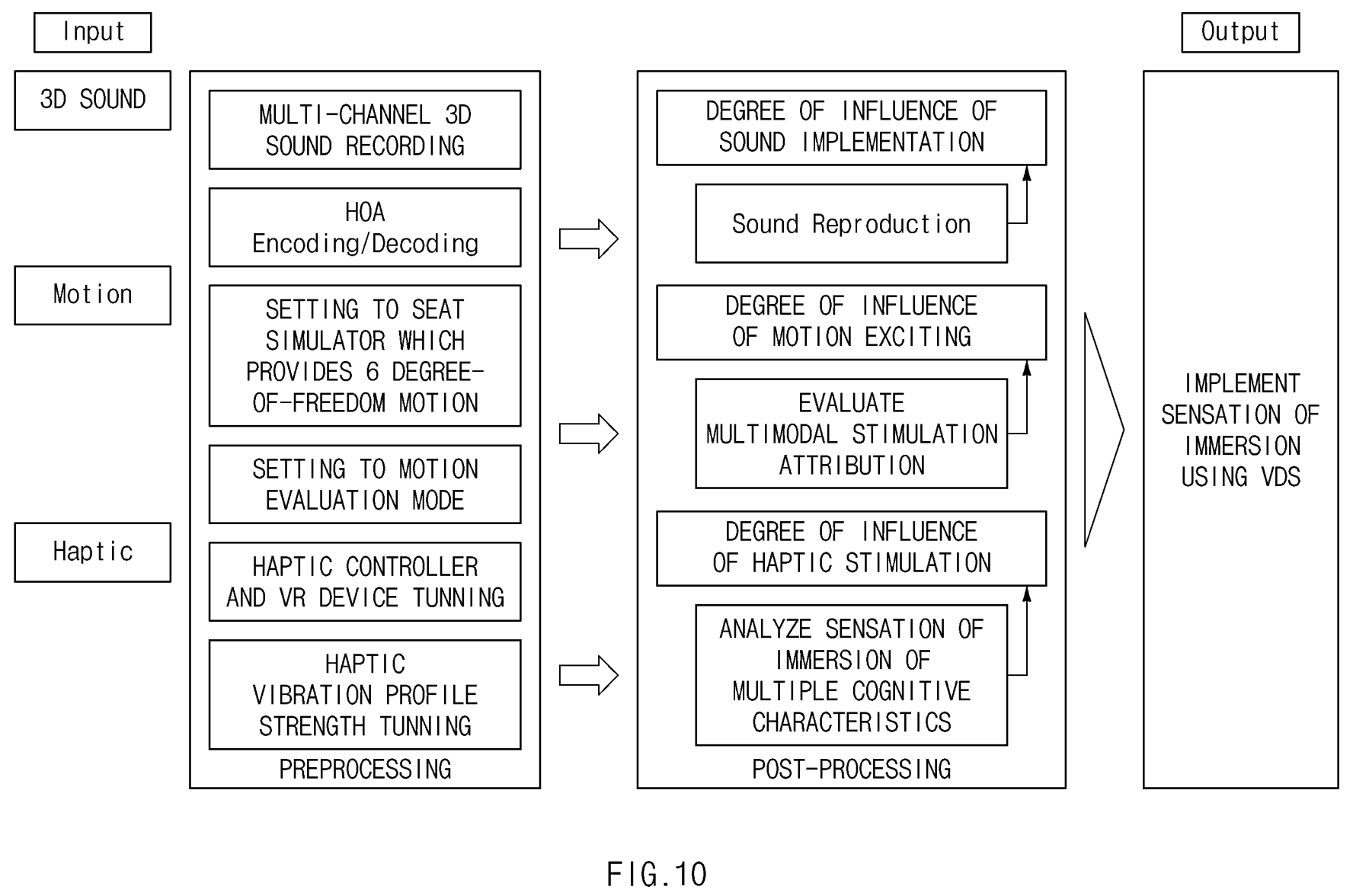

Input

3D SOUND

Motion

Haptic

PREPROCESSING

MULTI-CHANNEL 3D SOUND RECORDING

HOA Encoding/Decoding

SETTING TO SEAT SIMULATOR WHICH PROVIDES 6 DEGREE-OF-FREEDOM MOTION

SETTING TO MOTION EVALUATION MODE

HAPTIC CONTROLLER AND VR DEVICE TUNNING

HAPTIC VIBRATION PROFILE STRENGTH TUNNING

POST-PROCESSING

DEGREE OF INFLUENCE OF SOUND IMPLEMENTATION

Sound Reproduction

DEGREE OF INFLUENCE OF MOTION EXCITING

EVALUATE MULTIMODAL STIMULATION ATTRIBUTION

DEGREE OF INFLUENCE OF HAPTIC STIMULATION

ANALYZE SENSATION OF IMMERSION OF MULTIPLE COGNITIVE CHARACTERISTICS

Output

IMPLEMENT SENSATION OF IMMERSION USING VDS

APPARATUS AND METHOD FOR PROVIDING VEHICLE SOUND

CROSS-REFERENCE TO RELATED APPLICATION

This application claims the benefit of and priority to Korean Patent Application No. 10-2022-0173893, filed on Dec. 13, 2022, the entire contents of which are incorporated herein by reference.

TECHNICAL FIELD

The present disclosure relates to an apparatus and a method for providing a vehicle sound.

BACKGROUND

A healthcare system is a technology of identifying a state of a driver and guiding the driver to receive guidance and alert and perform safe driving in connection with a vehicle system. The healthcare system may collect biometric information, such as electrocardiogram (ECG), heart rates, movement of the driver, and the like, using sensors to determine the state of the driver. Furthermore, the healthcare system may y recognize a facial expression of the driver using a camera to determine an emotional state of the driver.

The above information disclosed in the background section is merely for enhancement of understanding of the background of the disclosure and therefore it may contain information that does not form prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides an apparatus and a method for providing a vehicle sound to recognize an emotional state of a driver using music information of the driver in an electronic device and provide an emotional sound of a sound type matched with the recognized emotional state.

Another aspect of the present disclosure provides an apparatus and a method for providing a vehicle sound to determine a music emotional quotient (EQ) index with regard to a driver's emotional state, a driver's driving pattern, and a road driving condition and provide an emotional sound based on the determined music EQ index.

The technical problems to be solved by the present disclosure are not limited to the aforementioned problems, and any other technical problems not mentioned herein should be clearly understood from the following description by those having ordinary skill in the art to which the present disclosure pertains.

According to an embodiment of the present disclosure, an apparatus for providing a vehicle sound may include a communicator configured to communicate with an electronic device, a detector configured to detect driver's driving pattern information and road driving condition information of a vehicle, and a controller coupled to the communicator and the detector. The controller may be configured to obtain music information from the electronic device, and calculate a music emotional quotient (EQ) index based on the music information, the driver's driving pattern information, and the road driving condition information. The controller may also be configured to select a game sound type based on the music EQ index, and may provide an emotional sound matched with the game sound type.

In an aspect, the controller may be configured to analyze a music pattern included in the music information and parameterizes an emotional adjective.

In an aspect, the controller may be configured to generate the emotional sound using granular synthesis.

In an aspect, the controller may be configured to generate the emotional sound using a formant filter.

In an aspect, the controller may be configured to identify whether there is a passenger other than a driver in the vehicle and analyze image information inside the vehicle, the image information being obtained by a camera installed in the vehicle. The controller may be configured to identify whether the passenger is a predetermined passenger type when it is identified that there is the passenger, and to play an emotional sound of a predetermined concept when the passenger is the predetermined passenger type.

In an aspect, the controller may be configured to determine the game sound type based on music preference.

The controller may be configured to analyze a game sound based on the music EQ index and may match an external factor and an internal factor based on game content with driving personalization emotion and may guide a driver through the emotional sound.

In an aspect, the controller may be configured to correct a volume of the emotional sound based on the driver's driving pattern information and the road driving condition information.

According to another embodiment of the present disclosure, a method for providing a vehicle sound may include obtaining music information from an electronic device and detecting driver's driving pattern information and road driving condition information of a vehicle. The method may also include calculating a music emotional quotient (EQ) index based on the music information, the driver's driving pattern information, and the road driving condition information. The method may additionally include selecting a game sound type based on the music EQ index, and providing an emotional sound matched with the game sound type.

In an aspect, calculating the music EQ index may include analyzing a music pattern included in the music information and parameterizing an emotional adjective.

In an aspect, providing the emotional sound may include generating the emotional sound using granular synthesis.

In an aspect, providing the emotional sound may include generating the emotional sound using a formant filter.

In an aspect, the method may further include identifying whether there is a passenger other than a driver in the vehicle, analyzing image information inside the vehicle, the image information being obtained by a camera installed in the vehicle. The method may also include identifying whether the passenger is a predetermined passenger type when it is identified that there is the passenger, and playing an emotional sound of a predetermined concept when the passenger is the predetermined passenger type.

In an aspect, selecting the game sound type may include determining the game sound type based on music preference.

In an aspect, selecting the game sound type may include analyzing a game sound based on the music EQ index and matching an external factor and an internal factor based on game content with driving personalization emotion and guiding a driver through the emotional sound.

In an aspect, providing the emotional sound may include correcting volume of the emotional sound based on the driver's driving pattern information and the road driving condition information.

BRIEF DESCRIPTION OF THE DRAWINGS

The above and other objects, features and advantages of the present disclosure should be more apparent from the following detailed description taken in conjunction with the accompanying drawings, in which:

FIG. 6 is a drawing illustrating a process of parameterizing an emotional adjective by analyzing a music pattern, according to an embodiment of the present disclosure;

FIG. 9 is a flowchart illustrating a method for providing a vehicle sound, according to an embodiment of the present disclosure; and FIG. 10 is a flow diagram illustrating a method for improving a sensation of immersion, according to embodiments of the present disclosure.

DETAILED DESCRIPTION

Figure 1:
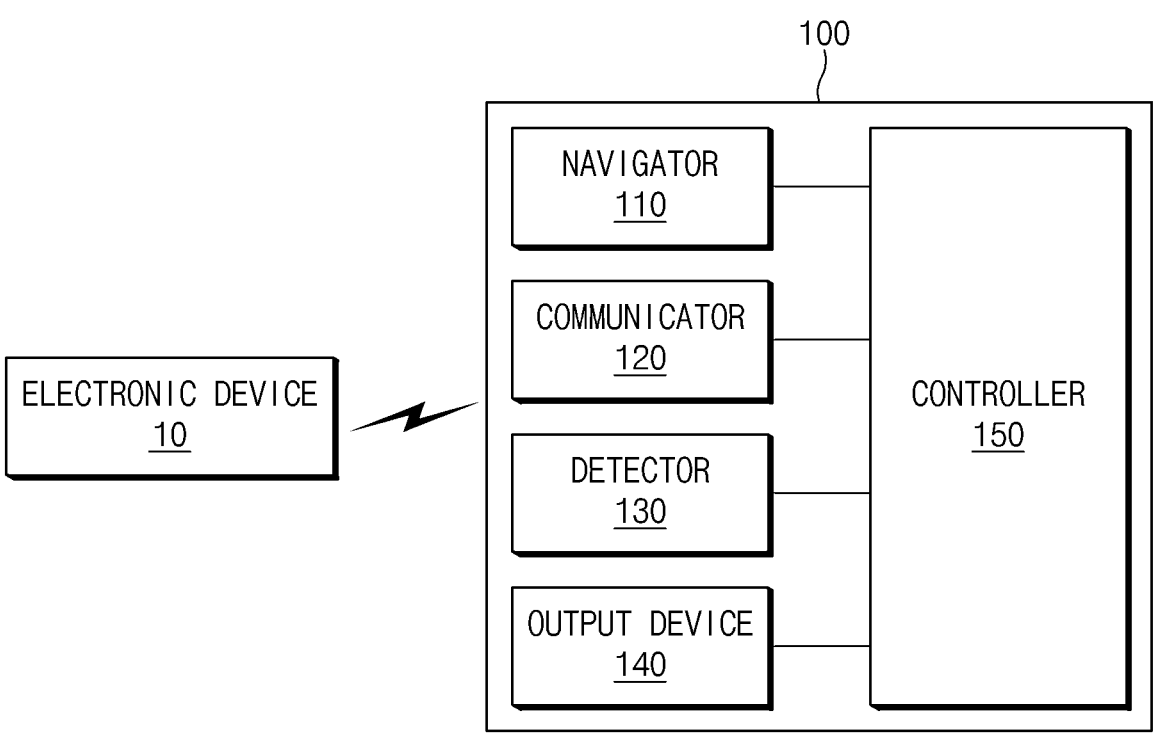
FIG. 1 is a block diagram illustrating a configuration of an apparatus for providing a vehicle sound, according to an embodiment of the present disclosure.

Hereinafter, embodiments of the present disclosure are described in detail with reference to the accompanying drawings. In the drawings, the same reference numerals are used throughout to designate the same or equivalent elements. In the specification, detailed descriptions of well-known features or functions are omitted in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or perform that operation or function.

Figure 2:
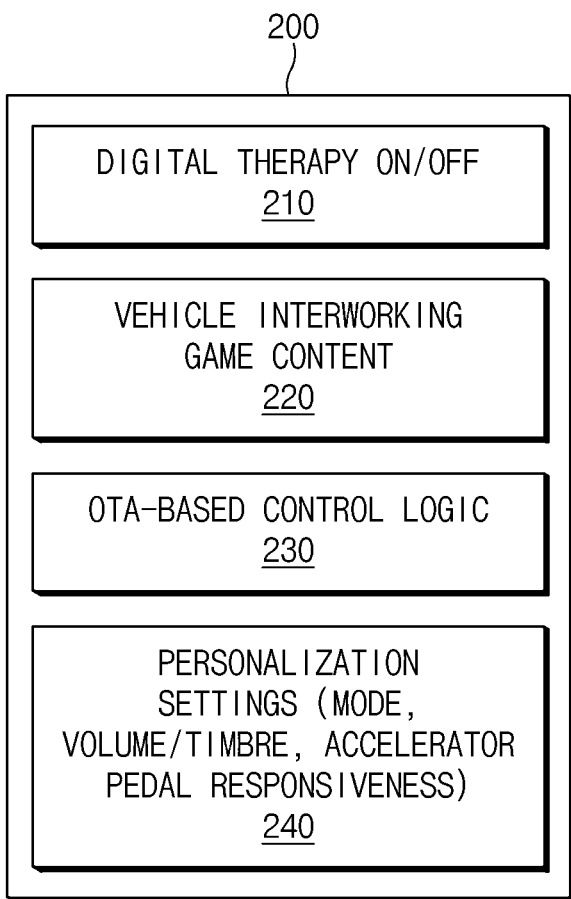
FIG. 2 is a drawing illustrating a configuration of an application of an electronic device, according to an embodiment of the present disclosure.

FIG. 1 is a block diagram illustrating a configuration of an apparatus for providing a vehicle sound, according to an embodiment of the present disclosure. FIG. 2 is a drawing illustrating a configuration of an application of an electronic device, according to an embodiment of the present disclosure.

An apparatus 100 for providing a vehicle sound may be provided in an electrification vehicle, such as an electric vehicle (EV), a plug-in hybrid electric vehicle (PHEV), and/or a hybrid electric vehicle (HEV), that travels using an electric motor, and/or an autonomous vehicle. As shown in FIG. 1, the apparatus 100 for providing the vehicle sound may include a navigator 110, a communicator 120, a detector 130, an output device 140, and a controller 150.

When a destination is set, the navigator 110 may navigate a driving route to the destination and may guide a driver along the navigated driving route. When navigating the driving route, the navigator 110 may reflect real-time traffic information to search for an optimal route. Although not illustrated in FIG. 1, the navigator 110 may include a memory for storing map data, a global positioning system (GPS) receiver for measuring a vehicle location, a communication module for receiving traffic information from the outside, a processor for navigating a driving route and guiding the driver along the navigated driving route, and/or the like.

The communicator 120 may enable the apparatus 100 to provide a vehicle sound for communication with an external electronic device (e.g., a sound source server, an electronic device 10, or the like). The communicator 120 may include a short range wireless communication circuit (e.g., Bluetooth or the like), a wireless communication circuit (e.g., wireless-fidelity (Wi-Fi) or the like), a wired communication circuit, and/or the like.

The communicator 120 may enable the apparatus 100 to provide the vehicle sound for communication with electronic control units (ECUs) mounted on the vehicle. The communicator 120 may include a transceiver configured to transmit and receive a controller area network (CAN) message using a CAN protocol.

The detector 130 may detect an internal factor (or a driver's driving pattern) and an external factor (or a road driving condition) of the vehicle. The detector 130 may detect the internal factor and the external factor of the vehicle using sensors and/or ECUs mounted on the vehicle. An accelerator position sensor (APS), a steering angle sensor, a microphone, an image sensor, a distance sensor, a wheel speed sensor, an advanced driver assistance system (ADAS) sensor, a 3-axis accelerometer, an inertial measurement unit (IMU), and/or the like may be used as the sensors. The ECUs may be a motor control unit (MCU), a vehicle control unit (VCU), and/or the like. Furthermore, the detector 130 may obtain image information inside the vehicle using a camera installed in the vehicle.

The output device 140 may play and output an emotional sound (or a digital therapy sound) by means of speakers mounted on the inside and/or outside of the vehicle. The output device 140 may play and output a sound source which is previously stored or is streamed in real time. The output device 140 may include an amplifier, a sound playback device, and/or the like. The sound playback device may adjust and play volume, timbre (or sound quality), a sound image, and/or the like of the sound under an instruction of the controller 150. The sound playback device may include a digital signal processor (DSP), microprocessors, and/or the like. The amplifier may amplify an electrical signal of the played sound.

The controller 150 may be connected with the navigator 110, the communicator 120, the detector 130, and the output device 140 to control the overall operation of the apparatus 100 for providing the vehicle sound. The controller 150 may include a memory and a processor. The memory may be a non-transitory storage medium that stores instructions executed by the processor. The memory may include a big data-based sound database (DB). The big data-based sound DB may include a future-oriented DB, a human voice DB, a natural sound DB, an animal sound DB, and an exhaust sound DB. The memory may store a sound source of a vehicle sound such as a tire slip sound, a warning sound, a driving sound, an acceleration sound, and/or a cornering sound. The memory may store an emotional sound algorithm, a smart emotional care algorithm, a driver emotional model, a pleasure arousal dominance (PAD) model, and/or the like. The memory may include at least one of a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), universal flash storage (UFS), web storage, or a combination thereof. The processor may include at least one of an application specific integrated circuit (ASIC), a digital signal processor (DSP), programmable logic devices (PLD), field programmable gate arrays (FPGAs), a central processing unit (CPU), microcontrollers, microprocessors, or a combination thereof.

The controller 150 may interwork with the electronic device 10 through the communicator 120 to provide an emotional sound (or a digital therapy sound). The electronic device 10 may be a device, such as a smartphone, a tablet, and/or a laptop, that may include a communication circuit (e.g., a short range communication circuit), a memory, a user interface (e.g., a touch screen), and a processor. An application 200 for supporting the driver to use digital therapy content may be installed in the electronic device 10. As shown in FIG. 2, the application 200 may include a digital therapy ON/OFF function 210, vehicle interworking game content 220, over the air (OTA)-based control logic 230, and a personalization setting (e.g., mode, volume and timbre, accelerator pedal responsiveness, or the like) function 240.

The controller 150 may obtain music information from the electronic device 10 using the communicator 120. The music information may include a music playback list. The controller 150 may obtain driver's driving pattern information (or an internal factor) and road driving condition information (or an external factor) using the navigator 110 and/or the detector 130. The driver's driving pattern information may include a constant speed, slow acceleration, rapid acceleration, and/or the like. The road driving condition information may include a congested city road, a country road, and/or a highway.

The controller 150 may calculate a music emotional quotient (EQ) index based on the music information, the driver's driving pattern information, and the road driving condition information. The controller 150 may recognize (or determine) a driver's emotional state using the music information. The controller 150 may parameterize an emotion adjective by analyzing the music pattern.

The controller 150 may analyze and digitalize a sound source as a music EQ index based on big data. The music EQ index may be represented as Equation 1 below.

$$\text{Music EQ Index} = \text{Pleasure}(x1+x2) + \text{Arousal}(y1+y2) + \text{Dominance}(z1+z2) \qquad \text{Equation 1}$$

In Equation 1, x1 denotes the musical contrast score, x2 denotes the reverberation score, y1 denotes the transliteration score, y2 denotes the tonality score, z1 denotes the speed score, and z2 denotes the size score. The score for each item may be assigned within a predetermined range (e.g., 1 to 5 points).

The controller 150 may select a game sound type depending on the calculated music EQ index. The controller 150 may determine a game sound type based on music preference. The controller device 150 may guide a driver through an emotional sound based on game content.

For example, the controller 150 may select a fun healing sound when there are "Pleasure (8 to 10 points)+Arousal (5 to 7 points)+Dominance (2 to 4 points)". As another example, the controller 150 may select a comfortable and familiar sound when there are "Arousal (8 to 10 points)+Dominance (5 to 7 points)+Pleasure (2 to 4 points)". As yet another example, the controller 150 may select a unique personalized sound when there are "Dominance (8 to 10 points)+Pleasure (5 to 7 points)+Arousal (2 to 4 points)".

In other words, the controller 150 may select the fun healing sound (or an entertainment type) when the "Pleasure" score is high in the music EQ index, may select the comfortable and familiar sound (or a sandbox type) when the "Arousal" score is high in the music EQ index, and may select the unique personalized sound (or an expert type) when the "Dominance" score is high in the music EQ index.

The controller 150 may provide an emotional sound matched with the game sound type. The game sound type may be classified into an entertainment-type racing game sound, a sandbox-type game sound, or an expert-type racing game sound. For example, the controller 150 may provide the fun healing sound when the entertainment-type racing game sound type is selected. As another example, the controller 150 may provide the comfortable and familiar sound when the sandbox-type game sound type is selected. As yet another example, the controller 150 may provide the unique personalized sound when the expert-type racing game sound type is selected.

When the unique personalized sound is determined, the controller 150 may set an output mode of a sound, volume of the sound, timbre of the sound, accelerator pedal responsiveness, and the like by means of personalized sound settings.

The controller 150 may filter a specific frequency (e.g., a medium-frequency domain and a high-frequency domain) based on the driver's driving pattern information and/or the road driving condition information to prevent a sense of difference. The controller 150 may correct volume of the sound based on the driver's driving pattern information and/or the road driving condition information.

The controller 150 may generate an emotional sound using granular synthesis. The granular synthesis is a sound synthesis method for decomposing a sound into very small units and then collecting short sounds to generate a new sound. The granular synthesis may arrange subtle sounds and may generate a dense sound through processing and reprocessing. The granular synthesis may pass through sequencing (or composition), recording, and post-processing.

Figure 3:
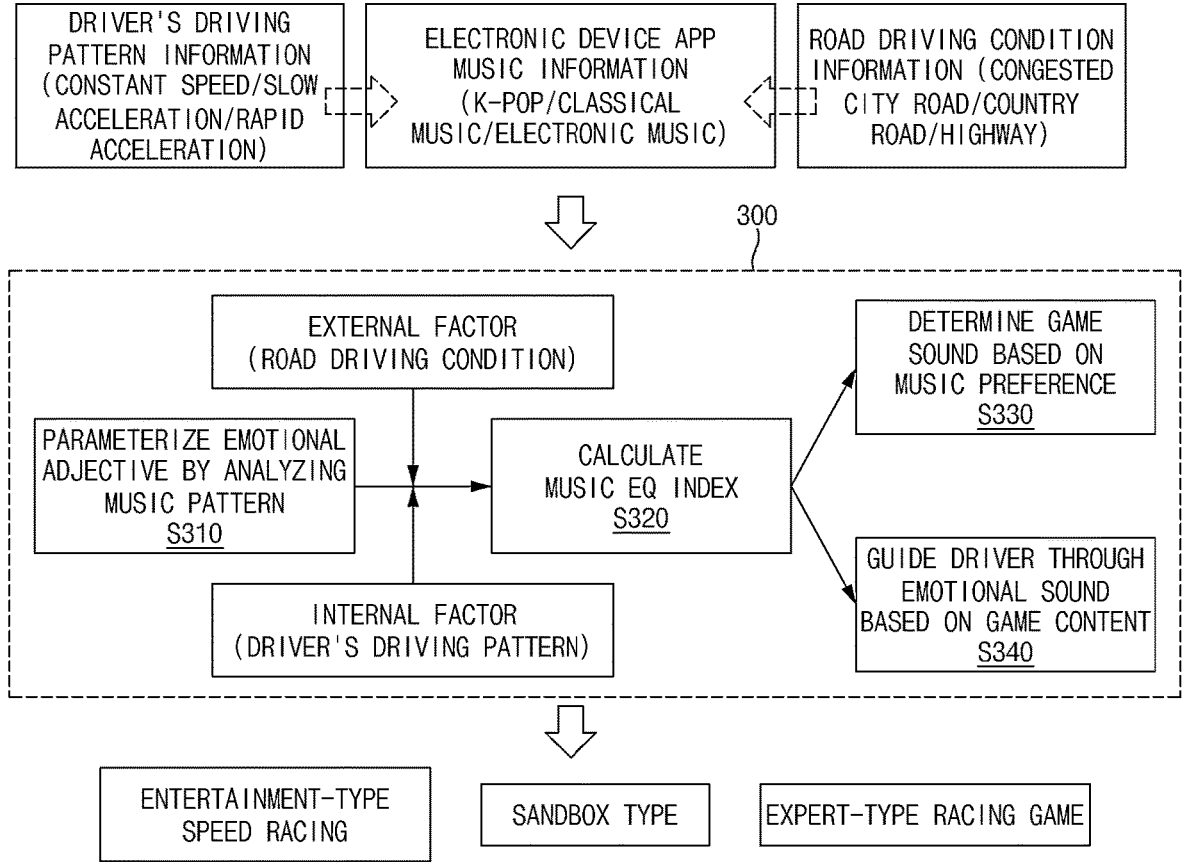
FIG. 3 is a drawing illustrating a process of designing an emotional sound by means of an emotional sound algorithm, according to an embodiment of the present disclosure.
Figure 4:
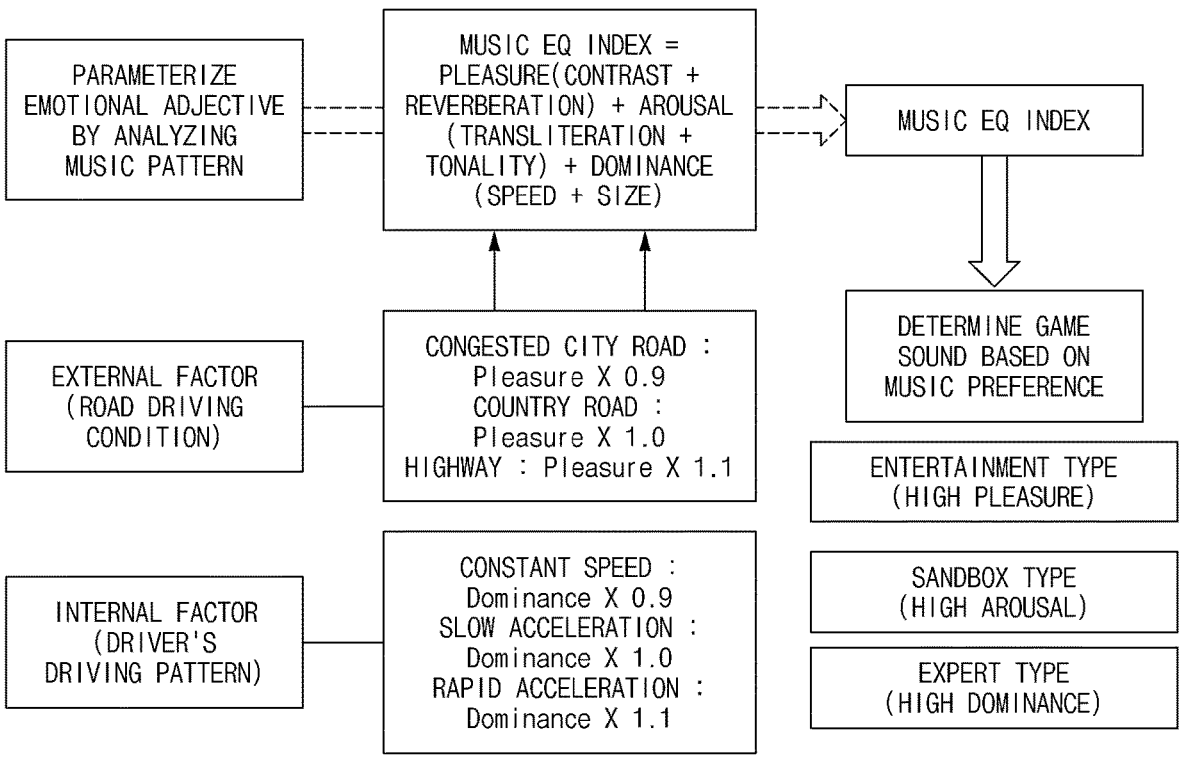
FIG. 4 is a drawing for describing a game sound matching method of an emotional sound algorithm, according to an embodiment of the present disclosure.
Figure 5:
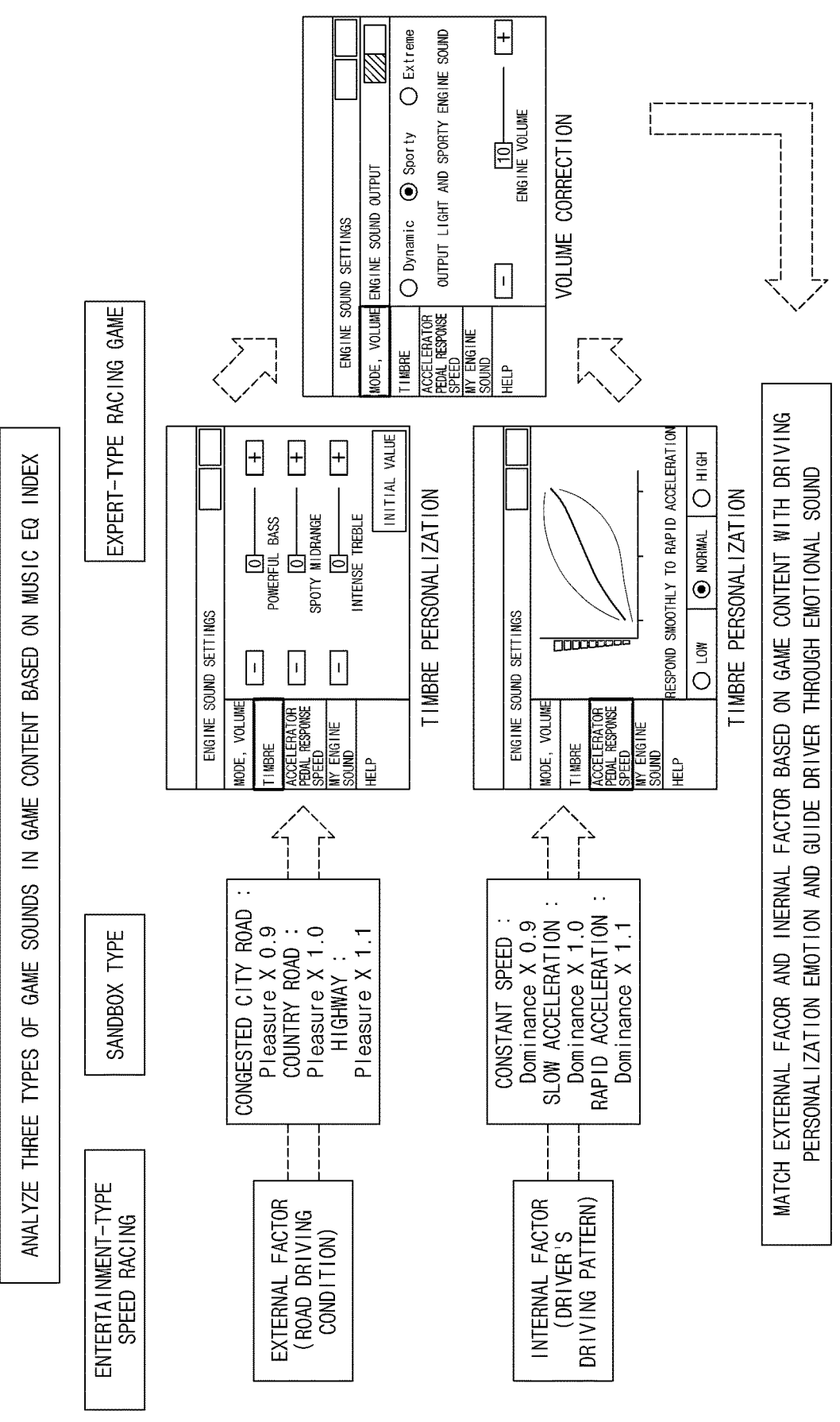
FIG. 5 is a drawing for describing an emotional sound guide method based on game content by means of an emotional sound algorithm, according to an embodiment of the present disclosure.

FIG. 3 is a drawing illustrating a process of designing an emotional sound by means of an emotional sound algorithm, according to an embodiment of the present disclosure. FIG. 4 is a drawing for describing a game sound matching method of an emotional sound algorithm according, to an embodiment of the present disclosure. FIG. 5 is a drawing for describing an emotional sound guide method based on game content by means of an emotional sound algorithm, according to an embodiment of the present disclosure.

Referring to FIG. 3, an emotional sound algorithm 300 may receive music information from an application installed in an electronic device 10 of FIG. 1 (hereinafter referred to as an "electronic device app"). The music information may include a music database (DB), a music playback list, a music playback history, and/or the like managed by the electronic device application (app).

A processor or other device executing the emotional sound algorithm 300 may receive an internal factor and an external factor of a vehicle from a detector 130 of FIG. 1. The internal factor of the vehicle may include driver's driving pattern information, such as a constant speed, slow acceleration, and rapid acceleration. The external factor of the vehicle may include a congested city road, a country road, and a highway.

In an operation S310, the processor or other device executing the emotional sound algorithm 300 may parameterize an emotional adjective (or an emotional word) by analyzing a music pattern included in music information.

In an operation S320, the processor or other device executing the emotional sound algorithm 300 may calculate a music EQ index based on the result of analyzing the music pattern. The emotional sound algorithm 300 may consider the external factor and/or the internal factor when calculating the music EQ index. For example, the processor or other device executing the emotional sound algorithm 300 may calculate the music EQ index based on the result of the analyzing the music pattern, the driver's driving pattern information, and the road driving condition information.

In an operation S330, the processor or other device executing the emotional sound algorithm 300 may select a game sound type based on the music EQ index. In an operation S340, the processor or other device executing the emotional sound algorithm 300 may guide a driver through an emotional sound matched with the selected game sound type. The processor or other device executing the emotional sound algorithm 300 may determine a game sound based on the music preference. The processor or other device executing the emotional sound algorithm 300 may guide the driver through an emotional sound based on game content.

Referring to FIG. 4, the processor or other device executing the emotional sound algorithm 300 may multiply pleasure emotion of the music EQ index by a predetermined coefficient for each external factor (or each road driving condition) to reflect the external factor in the music EQ index. The predetermined coefficient may be predetermined by a data analysis of pleasure based on driver's emotional determination modeling according to the road driving condition. With respect to the country road driving condition, a depressed/anxious/angry feeling may be measured when the vehicle travels on a congested city road, and a good/comfortable/pleasure feeling may be measured when the vehicle travels on a highway. A coefficient for reflecting a factor in a volume correction algorithm according to the contrast of the music EQ index may be determined by a correlation equation based on big data derived based on it. For example, 0.9 may be multiplied by a pleasure term in a congested city road, 1.0 may be multiplied by the pleasure term in a country road, and 1.1 may be multiplied by the pleasure term in a highway. In an example, the processor or other device executing the emotional sound algorithm 300 may multiply pleasure emotion of the music EQ index by 0.9 in a condition where the vehicle travels in the congested city section, may multiply pleasure emotion of the music EQ index by 1.0 in a condition where the vehicle travels on the country road, and may multiply pleasure emotion of the music EQ index by 1.1 in a condition where the vehicle travels on the highway.

Furthermore, the processor or other device executing the emotional sound algorithm 300 may multiply dominance emotion of the music EQ index by a predetermined coefficient for each internal factor (or each road driving pattern) to reflect the internal factor in the music EQ index. The predetermined coefficient may be determined by sound pressure level (SPL) data in the interior of the vehicle according to the driver's driving pattern. According to the result of analyzing the SPL data in the interior of the vehicle, there tends to be a difference of about 10 dB depending on a relative condition, in a level of 65 dBA when the vehicle travels at a constant speed, in a level of 75 dBC. when the vehicle accelerates slowly, or in a level of 85 dBC when the vehicle accelerates rapidly. A coefficient for reflecting a factor in the volume correction algorithm according to the speed of the music EQ index may be determined by a correlation equation based on big data derived based on it. Thus, 0.9 may be multiplied by a dominance term when the vehicle travels at a constant speed, 1.0 may be multiplied by the dominance term when the vehicle accelerates slowly, and 1.1 may be multiplied by the dominance term when the vehicle accelerates rapidly. For example, the processor or other device executing the emotional sound algorithm 300 may multiply dominance emotion of the music EQ index by 0.9 when the vehicle travels at the constant speed, may multiply the dominance emotion of the music EQ index by 1.0 when the vehicle accelerates slowly, and may multiply the dominance emotion of the music EQ index by 1.1 when the vehicle accelerates rapidly. The processor or other device executing the emotional sound algorithm 300 may determine driver's music preference based on the music EQ index. The processor or other device executing the emotional sound algorithm 300 may determine a game sound based on the determined music preference. For example, the processor or other device executing the emotional sound algorithm 300 may select an entertainment-type game sound when the "Pleasure" score is high in the music EQ index, may select a sandbox-type game sound when the "Arousal" score is high in the music EQ index, and may select an expert-type game sound when the "Dominance" score is high in the music EQ index.

Referring to FIG. 5, the processor or other device executing the emotional sound algorithm 300 may analyze three types of game sounds in game content based on the music EQ index. The processor or other device executing the emotional sound algorithm 300 may match an external factor and an internal factor based on game content with driving personalization emotion and may guide the driver through an emotional sound. The processor or other device executing the emotional sound algorithm 300 may personalize timbre of the sound and accelerator pedal responsiveness based on actual vehicle feedback and may correct volume of the sound. The processor or other device executing the emotional sound algorithm 300 may match a "fun healing sound" when the concept of game content is an entertainment type, may match a "comfortable and familiar sound" when the concept of the game content is a sandbox type, and may match a "unique personalized sound" when the concept of the game content is an expert type. The entertainment type may be matched with all the congested city road driving condition in the external factor and the constant speed, slow acceleration, and rapid acceleration conditions in the internal factor. The sandbox type may be matched with the country road driving condition in the external factor and the constant speed condition in the internal factor. The entertainment type may be matched with the highway driving condition in the external factor and the slow acceleration and rapid acceleration conditions in the internal factor. Thus, the processor or other device executing the emotional sound algorithm 300 may guide the driver through an emotional sound based on game content by analyzing the music EQ index.

FIG. 6 is a drawing illustrating a process of parameterizing an emotional adjective by analyzing a music pattern, according to an embodiment of the present disclosure.

Referring to FIG. 6, the apparatus 100 for providing a vehicle sound in FIG. 1 may analyze a music pattern registered in a sound source DB of an apparatus installed in the electronic device 10 of FIG. 1 and may measure an emotional state as "pleasure", "arousal", or "dominance".

The apparatus 100 may determine an emotional adjective of music according to the result of analyzing the music pattern. The emotional adjective may include a pleasure-related emotional word (e.g., fun, rhythmical, realistic, tearful, loud, frantic, mild, or angry), an arousal-related emotional word (e.g., comfortable, stable, impressive, smooth, soft, luxurious, sleepy, or uncomfortable), and/or a dominance-related emotional word (e.g., unique, danceable, futuristic, spaceship-like, refined, intense, obscure, or boring).

The apparatus 100 may parameterize the emotional adjective. For example, the apparatus 100 may determine a sound type (or concept) matched with the emotional adjective. The sound type may be classified as a fun healing sound, a comfortable and familiar sound, or a unique personalized sound. The fun healing sound (or a first sound type) may help control an impulse and control an emotion, such as anxiety or anger, which cause stress. The comfortable and familiar sound (or a second sound type) may help encourage oneself and empathize with others without being frustrated through the stability of mind. The unique personalized sound (or a third sound type) may help bring out inner self-confidence, discover a creative idea, and build self-esteem.

Figure 7:
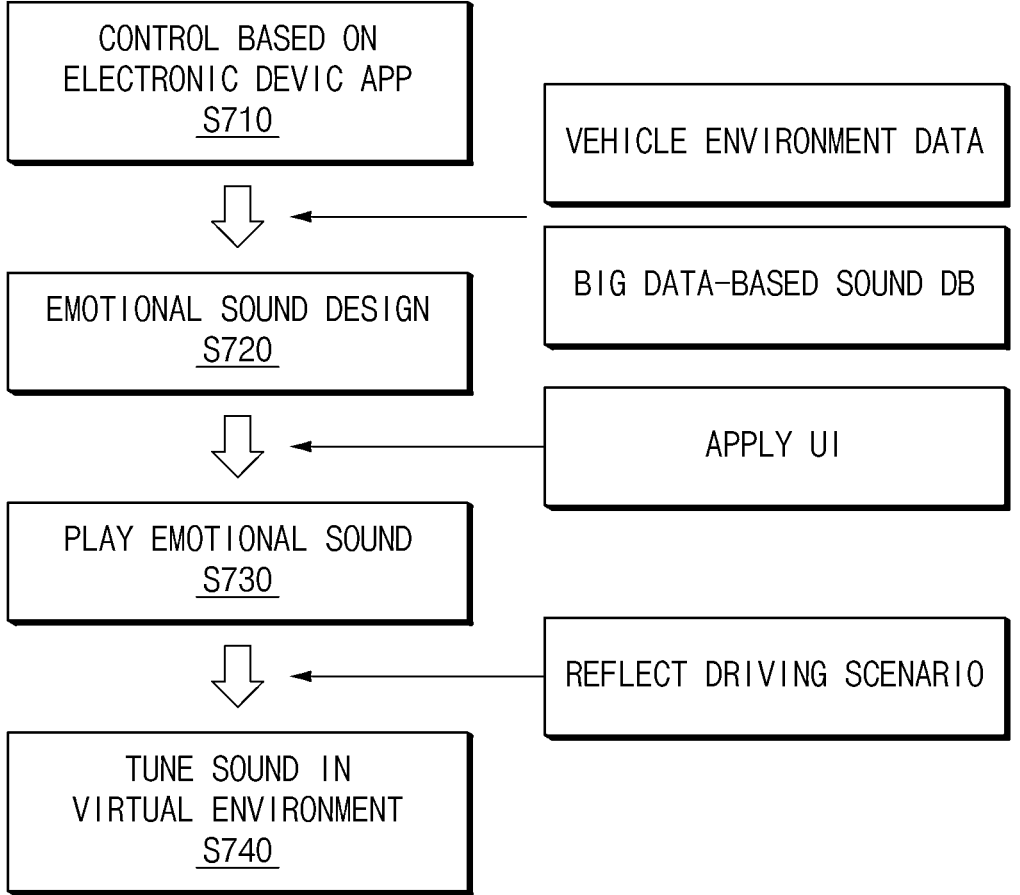
FIG. 7 is a flow diagram illustrating a method for generating an emotional sound, according to an embodiment of the present disclosure.

FIG. 7 is a flow diagram illustrating a method for generating an emotional sound, according to an embodiment of the present disclosure.

Referring to FIG. 7, in an operation S710, the apparatus 100 of FIG. 1 may receive control information from the electronic device 10 of FIG. 1. A driver may transmit control information by means of an application installed in the electronic device 10. The control information may include a game sound type selected based on user experience.

When the control information is received from the electronic device 10, in an operation S720, the apparatus 100 may design an emotional sound using vehicle environment data and a big data-based sound DB. The vehicle environment data may include a driving environment, a rapid acceleration driving step, a vehicle speed, an RPM, accelerator pedal responsiveness, and/or the like. The apparatus 100 may obtain an image using a camera on the outside of the vehicle. The apparatus 100 may analyze the image obtained by the camera to estimate (or recognize) a driving environment, for example, a congested city road, a country road, a highway, or the like.

In an operation S730, the apparatus 100 may play the designed emotional sound. The apparatus 100 may apply a user interface (UI) for proceeding with a sound evaluation in a virtual reality (VR) environment.

In an operation S740, the apparatus 100 may reflect a driving scenario to tune the emotional sound in a virtual environment.

Figure 8:
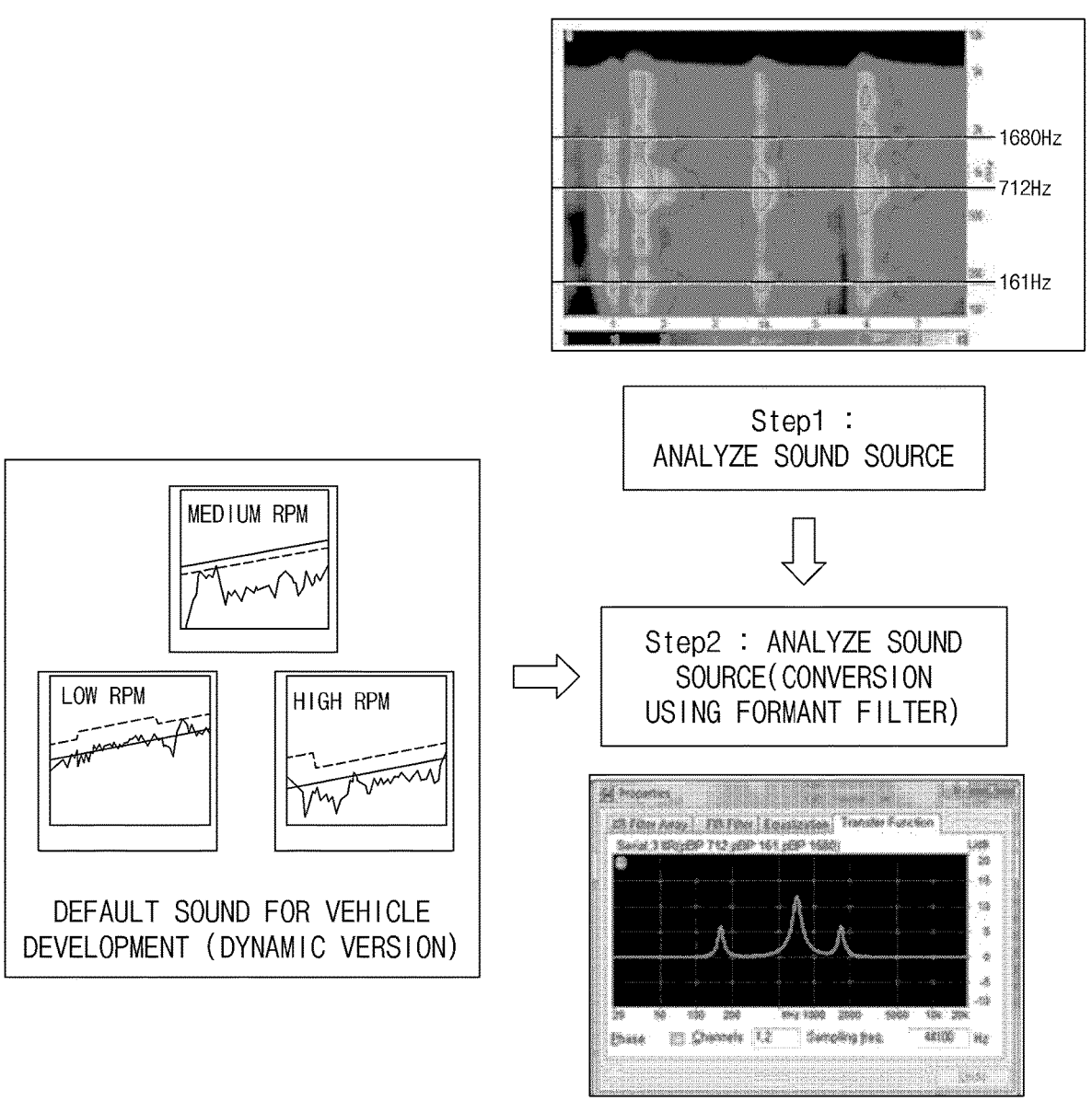
FIG. 8 is a drawing for describing a method for implementing an emotional sound, according to an embodiment of the present disclosure.

FIG. 8 is a drawing for describing a method for implementing an emotional sound, according to an embodiment of the present disclosure.

The apparatus 100 of FIG. 1 may analyze a sound source of an animal sound matched with a vehicle concept. The animal sound may be previously selected by a system designer or a user.

The apparatus 100 may perform a sound quality synthesis of the animal sound, which passes through a sound source analysis, and a vehicle engine sound (or a default sound for vehicle development) using a formant filter. The apparatus 100 may perform a sound quality synthesis depending on mixing logic. In an aspect, the apparatus 100 may divide an animal voice signal in the animal sound into three frequency domains using fast Fourier transform (FFT). The apparatus 100 may extract a feature vector in each divided frequency domain and may assign a weight for each frequency to the extracted feature vector. The apparatus 100 may emphasize an animal voice signal formant based on a human auditory experience model. The apparatus 100 may apply a smart emotional sound design concept to the process of performing the mixing logic. The apparatus 100 may convert an analog animal voice signal into a digital animal voice signal. The apparatus 100 may synthesize animal sounds of three frequency domains extracted by means of a sound source analysis with exhaust sounds in conjunction with a vehicle speed (or a low speed, a medium speed, and a high speed) and an RPM. The apparatus 100 may determine an impact timing based on the accelerator pedal opening amount. The apparatus 100 may generate a volume correction profile based on a driving environment, for example, a country road, the inside of a tunnel, or the like. The apparatus 100 may regenerate the sound, synthesized in sound quality, as a game sound based on a vehicle and smartphone app interface.

FIG. 9 is a flowchart illustrating a method for providing a vehicle sound. according to an embodiment of the present disclosure.

Referring to FIG. 9, in an operation S910, the apparatus 100 of FIG. 1 may receive driving condition information (e.g., a road driving environment or a driver's driving pattern) of a vehicle (e.g., an autonomous vehicle), electronic device app information, and image information inside the vehicle.

In an operation S920, the apparatus 100 may identify whether there is a passenger other than a driver in the vehicle.

When it is identified that there is a passenger other than the driver, in an operation S930, the apparatus 100 may identify the passenger is a predetermined passenger type. The apparatus 100 may analyze image information inside the vehicle and may determine a passenger type. For example, the apparatus 100 may analyze image information inside the vehicle and may determine whether the passenger is a crying child.

When the passenger is the predetermined passenger type, the method may proceed to an operation S940 in which the apparatus 100 may play an emotional sound of a predetermined concept. For example, when the passenger is the crying child, the apparatus 100 may play an entertainment-type sound for fun.

On the other hand, when it is identified in the operation S920 that there is no passenger other than the driver in the vehicle, i.e., there is only the driver in the vehicle, or when the passenger is not the predetermined passenger type in S930, the method may proceed to an operation S950 in which the apparatus 100 may calculate a music emotional quotient (EQ) index based on electronic device app information and driving condition information.

In an operation S960, the apparatus 100 may recommend a game sound based on the music EQ index.

In an operation S970, the apparatus 100 may play an emotional sound based on a vehicle environment matched with the recommended game sound.

FIG. 10 is a flow diagram illustrating a method for improving a sensation of immersion, according to embodiments of the present disclosure.

Referring to FIG. 10, the apparatus 100 of FIG. 1 may receive a 3D sound, motion information, and haptic information as input data.

The apparatus 100 may record a multi-channel 3D sound by means of a microphone. The apparatus 100 may perform higher-order ambisonics (HOA) encoding/decoding of the recorded sound to play a sound. The apparatus 100 may analyze a degree of influence of sound implementation.

The apparatus 100 may perform a setting to a seat simulator which provides 6 degree-of-freedom motion. The apparatus 100 may perform a setting to a motion evaluation mode. The apparatus 100 for providing the vehicle sound may evaluate multimodal stimulation attribution. The apparatus 100 may analyze a degree of influence of motion exciting.

The apparatus 100 may tune a haptic controller and a VR device. The apparatus 100 may tune haptic vibration profile strength. The apparatus 100 may analyze a sensation of immersion of multiple cognitive characteristics to analyze a degree of influence of haptic stimulation.

The apparatus 100 may implement a sensation of immersion to use virtual driving simulation based on the degree of influence of sound implementation, the degree of influence of motion exciting, and the degree of influence of haptic stimulation.

Embodiments of the present disclosure may recognize an emotional state of a driver using driving information of the driver in an electronic device and may play an emotional sound of a sound type matched with the recognized emotional state, thus providing personalized therapy.

Furthermore, embodiments of the present disclosure may determine a music emotional quotient (EQ) index with regard to a driver's emotional state, a driver's driving pattern, and a road driving condition and may play an emotional sound based on the determined music EQ index, thus reducing driver's stress.

Hereinabove, although the present disclosure has been described with reference to example embodiments and the accompanying drawings, the present disclosure is not limited thereto, but may be variously modified and altered by those having ordinary skill in the art to which the present disclosure pertains without departing from the spirit and scope of the present disclosure claimed in the following claims. Therefore, embodiments of the present disclosure are not intended to limit the technical spirit of the present disclosure, but are provided only for illustrative purposes. The scope of the present disclosure should be construed on the basis of the accompanying claims, and all the technical ideas within the scope equivalent to the claims should be included in the scope of the present disclosure.

What is claimed is:

1. An apparatus for providing a vehicle sound, the apparatus comprising:
   a communicator configured to communicate with an electronic device;
   a detector configured to detect driver's driving pattern information and road driving condition information of a vehicle; and
   a controller coupled to the communicator and the detector, wherein the controller is configured to:
   obtain music information from the electronic device,
   calculate a music emotional quotient (EQ) index based on the music information, the driver's driving pattern information, and the road driving condition information,
   select a game sound type based on the music EQ index, and
   provide an emotional sound matched with the game sound type.

2. The apparatus of claim 1, wherein the controller is configured to:
   analyze a music pattern included in the music information, and
   parameterize an emotional adjective based on the analyzed result.

3. The apparatus of claim 1, wherein the controller is configured to generate the emotional sound using granular synthesis.

4. The apparatus of claim 1, wherein the controller is configured to generate the emotional sound using a formant filter.

5. The apparatus of claim 1, wherein the controller is configured to:
   identify whether there is a passenger other than a driver in the vehicle,
   identify whether the passenger is a predetermined passenger type by analyzing image information inside the vehicle obtained by a camera in response to identifying that there is the passenger, and
   play an emotional sound of a predetermined concept in response to identifying that the passenger is the predetermined passenger type.

6. The apparatus of claim 1, wherein the controller is configured to determine the game sound type based on music preference.

7. The apparatus of claim 1, wherein the controller is configured to:
   analyze a game sound based on the music EQ index,
   match an external factor and an internal factor based on game content with driving personalization emotion, and
   guide a driver through the emotional sound based on the matched result.

8. The apparatus of claim 1, wherein the controller is configured to correct volume of the emotional sound based on the driver's driving pattern information and the road driving condition information.

9. A method for providing a vehicle sound, the method comprising:
   obtaining, by a controller, music information from an electronic device;
   detecting, by the controller, driving pattern information of a driver and road driving condition information of a vehicle;

calculating, by the controller, a music emotional quotient (EQ) index based on the music information, the driving pattern information, and the road driving condition information;

selecting, by the controller, a game sound type based on the music EQ index; and providing, by the controller, an emotional sound matched with the game sound type.

10. The method of claim 9, wherein calculating the music EQ index includes:

analyzing, by the controller, a music pattern included in the music information, and parameterizing, by the controller, an emotional adjective based on the analyzed result.

11. The method of claim 9, wherein providing the emotional sound includes:

generating, by the controller, the emotional sound using granular synthesis.

12. The method of claim 9, wherein providing the emotional sound includes:

generating, by the controller, the emotional sound using a formant filter.

13. The method of claim 9, further comprising:

identifying, by the controller, whether there is a passenger other than a driver in the vehicle;

identifying, by the controller, whether the passenger is a predetermined passenger type by analyzing image information inside the vehicle obtained by a camera in response to identifying that there is the passenger; and playing, by the controller, an emotional sound of a predetermined concept in response to identifying that the passenger is the predetermined passenger type.

14. The method of claim 9, wherein selecting the game sound type includes:

determining, by the controller, the game sound type based on music preference.

15. The method of claim 9, wherein selecting the game sound type includes:

analyzing, by the controller, a game sound based on the music EQ index, matching, by the controller, an external factor and an internal factor based on game content with driving personalization emotion, and guiding a driver through the emotional sound based on the matched result.

16. The method of claim 9, wherein providing the emotional sound includes:

correcting, by the controller, volume of the emotional sound based on the driving pattern information and the road driving condition information.

\* \* \* \* \*